No. 676,115. Patented June 11, 1901.
F. C. BILLINGS.
VEHICLE FRAME.
(Application filed June 20, 1900.)
(No Model.) 2 Sheets—Sheet 2.
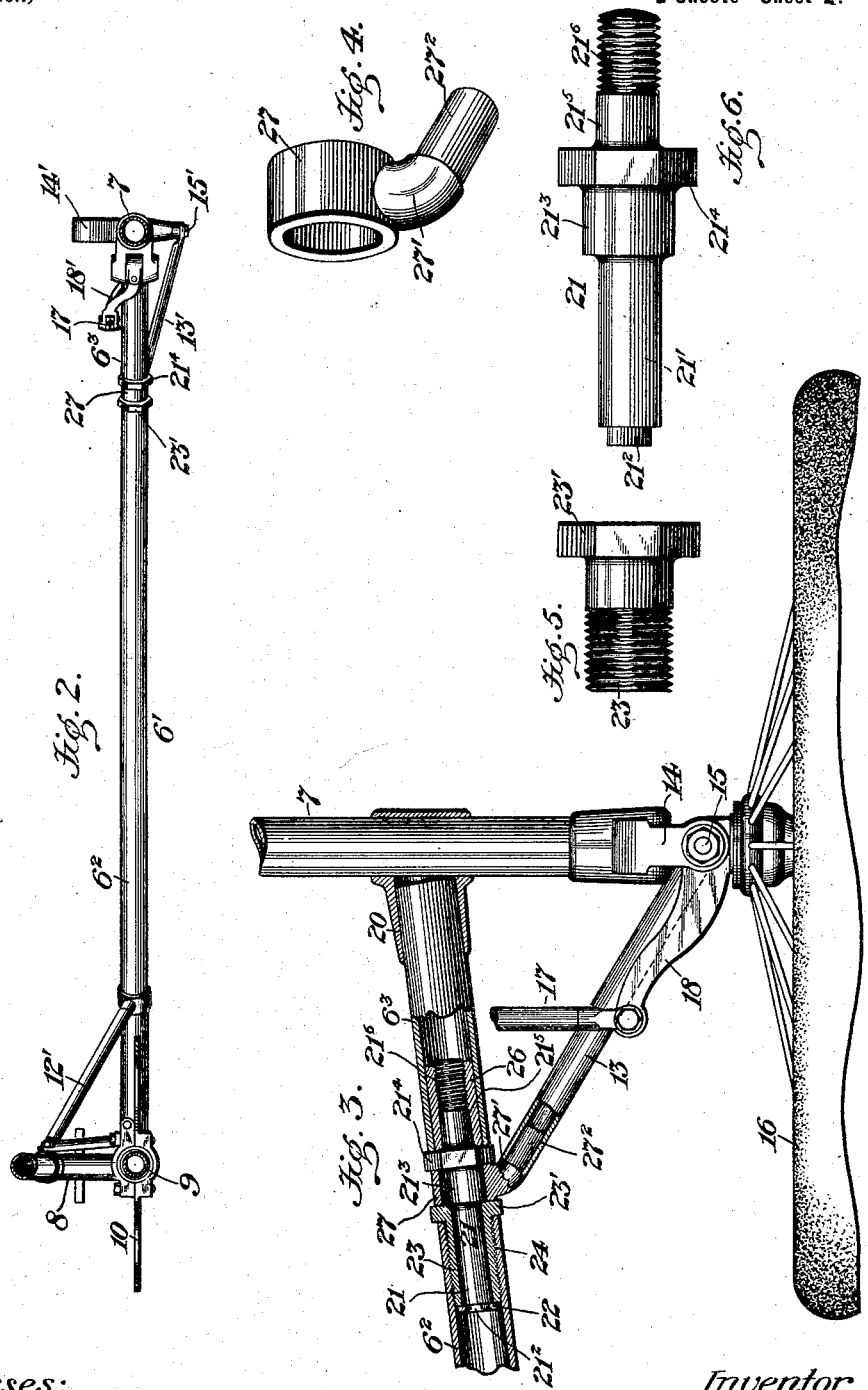
Witnesses:
Inventor,
Frederic C. Billings,
By his Attorney,

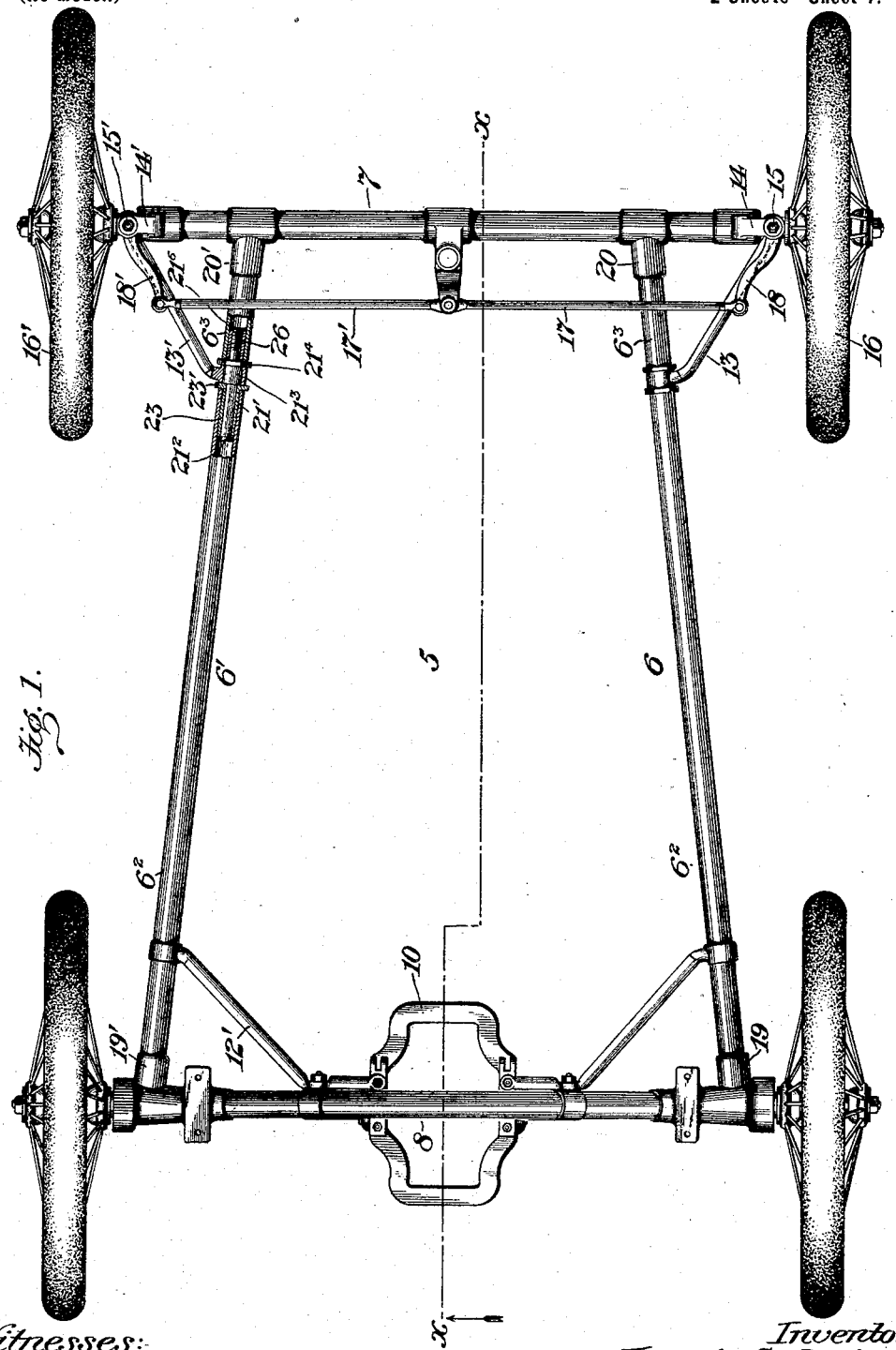

UNITED STATES PATENT OFFICE.

FREDERIC C. BILLINGS, OF HARTFORD, CONNECTICUT, ASSIGNOR TO AMERICAN BICYCLE COMPANY, OF NEW YORK, N. Y., AND JERSEY CITY, NEW JERSEY.

VEHICLE-FRAME.

SPECIFICATION forming part of Letters Patent No. 676,115, dated June 11, 1901.

Application filed June 20, 1900. Serial No. 20,934. (No model.)

*To all whom it may concern:*

Be it known that I, FREDERIC C. BILLINGS, a citizen of the United States, residing in Hartford, in the county of Hartford and State of Connecticut, have invented certain new and useful Improvements in Vehicle-Frames, of which the following is a specification.

My invention relates to running-gear frames for vehicles, and is shown applied to the frame of a motor-vehicle, although it is not limited thereto.

These frames are generally composed of tubular side-bars or reach-rods and tubular driving and steering axles, to which the side-bars are rigidly connected, and as such a frame is more or less flexible or elastic and is rigidly connected in all of its parts breakage, particularly at the joints, and permanent flexure at other points are liable to occur for the reason that the frame is not so constructed that it will give or yield to compensate for and accommodate itself to the various movements of the wheels while running over an uneven surface.

Primarily the object of my invention is the provision of a connection between the sections of the side-bars or reaches of a vehicle-frame, (which connection is in the nature of a yielding joint,) whereby the reaches will be automatically adjustable to the movements of the vehicle and will permit torsional action of the frame without liability of injurious strains, which often cause breakage of the parts or throw them permanently out of proper position.

A further object of the invention is the provision of a sectional reach and of means in the nature of a yielding joint in connection with said reach for permitting a torsional action of the frame without damaging the reach or its connections with the driving and steering axles.

A further object of the invention is the provision of a bolt of peculiar construction for connecting the sections of each reach, said bolt being adapted to receive an eye connected to a brace-rod leading to the forward axle, on which the steering-wheels are mounted.

In the accompanying drawings, Figure 1 is a plan view of a running-gear frame, showing my invention applied thereto. Fig. 2 is a longitudinal vertical section of the frame on line $x\,x$, Fig. 1, looking in the direction of the arrow, the steering and driving wheels being removed. Fig. 3 is a plan view, partially in section, of part of one of the sectional reaches, showing it connected to the front axle, with my invention in place therein. Fig. 4 is a perspective view of an eyepiece constituting a part of my invention; and Figs. 5 and 6 are side elevations, respectively, of the hollow screw and bolt (shown assembled within the sectional reach in Fig. 3) detached.

Like numerals designate similar parts throughout the several views.

Referring to the drawings, the numeral 5 designates in a general way the running-gear frame of a motor-vehicle, said frame being, except as otherwise specified, of conventional construction and composed of longitudinal side-bars or reaches, designated generally by 6 6', a front cross-bar 7, constituting the steering-wheel axle or front transverse member, a curved truss 8, connecting the rear ends of the side-bars and constituting the rear transverse member, a sectional rear axle 9, Fig. 2, a flat oblong frame 10, uniting the sections of the axle and receiving the usual compensating gearing, (not shown,) rear braces 12 12', and front braces 13 13', connected to the reaches and to the lower bearings 14 14' of the steering-axle, in which bearings pivots (shown as bolts 15 15') on which the steering-wheels 16 16' are swiveled are mounted. A common form of steering-linkage is also illustrated, and this consists of rods 17 17', connected by links 18 18' with arms or levers projecting from the hubs of said steering-wheels.

Each reach or side bar 6 6' is formed of two separate sections $6^2\,6^3$, the sections $6^2$ being secured at their rear ends in sleeves 19 19', projecting from the rear axle, and the sections $6^3$ being attached to similar sleeves 20 20', projecting from the steering-axle 7. As above stated, if these reaches or side-bars were rigid throughout their lengths any torsional or twisting action of the frame, which is liable to occur when the vehicle is running over uneven ground, will cause said frame to be placed under great tension, with the liability of the rupture or distortion of certain of the parts thereof, and my invention is designed to obviate this difficulty by permitting a play or slight movement of the sections of the reaches upon each other, so that the frame will be self-adjusting and the parts thereof will not be thrown out of alinement, a compensating action being thus obtained which enables the frame to conform to the movements of the vehicle while the wheels thereof are passing over uneven surfaces.

With this end in view I connect the sections of the reaches in such a manner that when subjected to torsional action each will have a slight movement around a device connecting said sections, and while a particular connecting device is shown for constituting a yielding joint it is distinctly to be understood that my invention is not limited thereto, for it includes within its purview any kind of a device carried by the sections of the reach and adapted for accomplishing the purpose stated.

In the form of my invention illustrated the tubular sections $6^2$ $6^3$ of each side-bar or reach are connected by a bolt 21, having a smooth reduced portion 21', with a tenon $21^2$ at one end, an enlarged circular intermediate portion or collar $21^3$, a hexagonal or other form of angular head $21^4$ for receiving a wrench, and a reduced portion $21^5$, threaded at $21^6$.

Mounted for free rotative movement upon the smooth portion $21^3$ of the bolt and shown secured thereon by a washer 22, held in place by upsetting the tenon $21^2$, or it may be secured in any other desired way, is an externally-threaded sleeve 23, having an angular head 23' for receiving a wrench, the threaded portion of said sleeve being adapted to be inserted in an internally-threaded portion 24 of the reach-section $6^2$, and threaded upon the section $21^6$ of the bolt is a sleeve 26, having a smooth periphery, said sleeve being adapted to be inserted and secured by brazing or otherwise in the smooth bore of the reach-section $6^3$. (See Fig. 3.)

Fitted over the cylindrical portion $21^3$ of the bolt and loosely held in place thereon by the heads or flanges $21^4$ 23' is an eyepiece 27, having a deflected shank 27' with a reduced stem $27^2$, adapted to be inserted and secured by brazing or otherwise in the end of the tubular brace 13, connecting the reach with the front axle.

In assembling the parts just described the sections of the reaches and the braces are first connected to their respective axles and the bolt 21 is screwed in the thimble 26. Then the eye 27 of brace 13 is put in place on the bearing $21^3$, (the other end of the brace being detached from bolt 15'.) Now the two parts of the reaches are brought together and the thimble 23 is screwed into the end of section $6^2$ of the reach, leaving the reach to swivel on part 21 and the brace to turn on its collar. The sleeve 26, it will be understood, is brazed or otherwise secured to the part $6^3$ of the reach.

The devices connecting the sectional reach 6' with the steering-axle are the same as those just described, and where shown in Fig. 1 are indicated by the same numerals. In this way a connection is provided which will enable the frame to rock and twist without endangering the reach. For instance, if the forward part of the frame is given a torsional movement the section $6^3$ of the reach, being brazed or otherwise secured to the sleeve 26, will cause the bolt to turn in the sleeve 23, and if the rear part of the vehicle should be given this motion the part $6^2$ of the reach will cause said sleeve to slightly rotate over the smooth reduced portion 21' of the bolt. While the parts are moving upon each other at one side of the vehicle, a similar result is permitted on the other side thereof, and therefore a compensating adjustment is permitted which will keep the parts of the frame in their proper positions without liability of distortion or breakage. Furthermore, the connection between each eyepiece 27, secured to braces 13 13' and the reach, is also in the nature of a yielding joint to permit play of the eyepiece upon the collar $21^3$ of the bolt.

My invention is not limited in scope, nor is it confined to the particular kind of frame shown, and other kinds of yielding joints may be substituted for those shown without departure therefrom.

Having described my invention, what I claim is—

1. In a frame for vehicles, the combination with the transverse members of reach-sections secured to the rear member, reach-sections secured to the front member, devices connecting the corresponding reach-sections, eyepieces loosely mounted on said devices, and braces connecting said eyepieces with the front member.

2. In a frame for a vehicle, the combination with the front and rear transverse members of tubular reach-sections projecting from the rear member, tubular reach-sections projecting from the front member, bolts uniting said sections, and devices carried by said bolts for uniting the sections, and permitting movement under strain.

3. In a frame for a vehicle, the combination with the front and rear members of tubular reach-sections projecting therefrom, bolts inserted in said sections, each of said bolts having a collar, devices carried by the bolts for uniting and permitting movement of reach-sections under strain, and a brace loosely connecting the collar on each bolt with a part of the frame.

4. In a vehicle-frame, the combination with a tubular sectional reach connecting the front and rear transverse members, one of said sections having an internal screw-thread, of a bolt, an externally-threaded sleeve in engagement with said internal screw-thread and loosely mounted on said bolt, and an internally-threaded sleeve having a smooth exterior surface secured to a threaded portion of the bolt, and fitted within the other reach-section.

5. In a frame for a vehicle a reach composed of tubular sections, one of which is threaded, a bolt carrying a threaded sleeve in engagement with the threaded reach-section, and a second sleeve secured to the bolt and coöperating with the other reach-section.

6. In a frame for a vehicle, a reach formed of two tubular sections, one of which is threaded, a bolt having a smooth portion at one end, and an externally-threaded portion at the other end, an externally-threaded sleeve loosely mounted on the smooth portion of the bolt and in engagement with the threaded portion of the reach-section, said sleeve having an angular head, and an internally-threaded sleeve having a smooth periphery in engagement with the threaded portion of the bolt, said sleeve being fitted within the other reach-section.

7. A yielding joint for a sectional reach comprising a bolt inserted within the sections of said reach and carrying a sleeve at each end, one of said sleeves being attached to one reach-section, and the other sleeve being secured within the complementary reach-section.

8. A yielding joint for a sectional reach comprising a bolt inserted within the sections of said reach, and carrying a sleeve at each end, one of said sleeves being attached to a reach-section by a threaded connection, and the other sleeve being threaded to the bolt and secured within the other reach-section.

9. In a vehicle-frame, the combination with the reach composed of two tubular sections, of a bolt fitted within said sections and secured to one of them, an eyepiece loosely surrounding the bolt, and a tubular brace connected to said eyepiece.

10. In a vehicle-frame, the combination with the tubular sectional reach, of a bolt having a collar intermediate its length, said collar being located between the reach-sections, an eyepiece sleeved upon the collar of the bolt and having a deflected shank, means for securing the bolt to one of the reach-sections, and a brace for connecting said eyepiece to one of the transverse members of the frame.

11. In a vehicle-frame, the combination with the front and rear transverse members, of tubular sectional reach-sections projecting therefrom, bolts connecting said reach-sections in such a manner that a yielding joint is formed between the sections of each reach, an eyepiece loosely mounted on each bolt intermediate the reach-sections, and braces connecting said eyepieces with one of the transverse members.

FREDERIC C. BILLINGS.

Witnesses:
F. C. BLAND,
H. B. BELFIELD.